United States Patent
Nomaru et al.

(10) Patent No.: US 8,378,257 B2
(45) Date of Patent: Feb. 19, 2013

(54) LASER PROCESSING APPARATUS

(75) Inventors: Keiji Nomaru, Ota-ku (JP); Taiki Sawabe, Ota-ku (JP)

(73) Assignee: Disco Corporation, Tokyo (JP)

( * ) Notice: Subject to any disclaimer, the term of this patent is extended or adjusted under 35 U.S.C. 154(b) by 679 days.

(21) Appl. No.: 12/610,718

(22) Filed: Nov. 2, 2009

(65) Prior Publication Data

US 2010/0133243 A1 Jun. 3, 2010

(30) Foreign Application Priority Data

Dec. 1, 2008 (JP) .................. 2008-306844

(51) Int. Cl.
*B23K 26/14* (2006.01)
(52) U.S. Cl. .......... 219/121.67; 219/121.75; 219/121.76
(58) Field of Classification Search ............ 219/121.67, 219/121.75, 121.76, 121.78, 121.79, 121.82, 219/121.83, 124.22, 121.62, 121.65; 250/559.29, 250/559.3
See application file for complete search history.

(56) References Cited

U.S. PATENT DOCUMENTS

| | | | | |
|---|---|---|---|---|
| 5,569,929 A | * | 10/1996 | Mizutani et al. | 250/548 |
| 2001/0020687 A1 | * | 9/2001 | Yamada et al. | 250/548 |
| 2004/0036849 A1 | * | 2/2004 | Kida et al. | 355/55 |

FOREIGN PATENT DOCUMENTS

| | | |
|---|---|---|
| JP | A 10-305420 | 11/1998 |
| JP | B2 3408805 | 7/2002 |
| JP | A 2008-170366 | 7/2008 |

* cited by examiner

*Primary Examiner* — Khiem D Nguyen
(74) *Attorney, Agent, or Firm* — Greer Burns & Crain, Ltd.

(57) ABSTRACT

A laser processing apparatus including a detecting unit. The detecting unit includes a white light source for emitting white light, a focusing lens for focusing the white light to the workpiece, a first optical fiber for guiding the white light emitted from the white light source to the focusing lens, a detector for detecting the intensity of reflected light from the workpiece, and a second optical fiber for guiding the reflected light to the detector. Accordingly, the white light to be focused to the workpiece can be easily handled and only a wavelength component focused on the workpiece can be stably propagated.

3 Claims, 10 Drawing Sheets

LASER PROCESSING APPARATUS

BACKGROUND OF THE INVENTION

1. Field of the Invention

The present invention relates to a laser processing apparatus for processing a workpiece such as a semiconductor workpiece by applying a processing laser beam.

2. Description of the Related Art

In a semiconductor device fabrication process, the front side of a substantially disk-shaped semiconductor workpiece is formed with a plurality of crossing streets (division lines) to thereby define a plurality of partitioned regions arranged like a matrix, and a plurality of circuits such as ICs and LSIs are formed in these partitioned regions. The semiconductor workpiece is cut along these streets to divide the partitioned regions where the plural circuits are respectively formed, thus fabricating a plurality of individual semiconductor chips. Cutting of the semiconductor workpiece along the streets is usually performed by using a cutting apparatus called a dicer. Another cutting method using a laser beam is also known.

For example, as a method of dividing a workpiece such as an optical device wafer along the streets, a method of forming a laser processed groove is known. In this method, a pulsed laser beam having an absorption wavelength to the workpiece is applied to the workpiece along each street to thereby form a laser processed groove along each street. The workpiece is next broken along each laser processed groove by applying an external force (see Japanese Patent Laid-Open No. Hei 10-305420, for example). Also known is another laser processing method using a pulsed laser beam having a transmission wavelength to a workpiece, wherein the pulsed laser beam is applied to the workpiece so as to be focused inside of the workpiece. In a workpiece dividing method using this laser processing method, the pulsed laser beam having a transmission wavelength to the workpiece is applied to the workpiece from one side thereof so as to be focused inside of the workpiece along each street, thereby continuously forming a modified layer inside the workpiece along each street. By forming the modified layer inside the workpiece along each street, the strength of the workpiece is lowered along each street. Accordingly, by applying an external force to the workpiece along each street, the workpiece is divided along each street (see Japanese Patent No. 3408805, for example).

However, a platelike workpiece such as a wafer has undulations, causing variations in surface height of the workpiece. Accordingly, in order to divide the workpiece into chips with good quality by applying an external force in each of the laser processing methods mentioned above, it is necessary to uniformly form the laser processed groove or the modified layer by detecting the surface height of the workpiece and correcting the focal position of the laser beam according to the result of detection in performing laser processing. For example, there has been proposed a detecting apparatus for detecting the surface height of a workpiece by using white light (see Japanese Patent Laid-Open No. 2008-170366, for example). This detecting apparatus utilizes the fact that the white light passed through a chromatic aberration lens has different focal lengths according to the wavelengths of the white light. Accordingly, by determining the wavelength of reflected light passed through a pinhole, the focal length of the reflected light is obtained to thereby measure the surface height of the workpiece.

SUMMARY OF THE INVENTION

In the detecting apparatus described in Japanese Patent Laid-Open No. 2008-170366 mentioned above, the reflected light from the workpiece is guided through the pinhole to a photodetector. Accordingly, there is a possibility that not only a wavelength component focused on the workpiece, but also the other wavelength components unfocused on the workpiece are guided to the photodetector. That is, this detecting apparatus is not satisfactory in measuring only the wavelength component focused on the workpiece efficiently and stably, and a further improvement in performance is desired. Further, in the detecting apparatus described in Japanese Patent Laid-Open No. 2008-170366 mentioned above, the white light emitted from a white light source is incident on the workpiece without limitation, so that the white light is hard to handle.

It is therefore an object of the present invention to provide a laser processing apparatus which can achieve easy handling of white light to be used for the detection of the surface height of a workpiece and can improve the performance of measurement of the surface height of the workpiece by the use of a wavelength component focused on the workpiece.

In accordance with an aspect of the present invention, there is provided a laser processing apparatus including holding means for holding a workpiece; processing laser beam applying means for applying a processing laser beam to the workpiece held by the holding means; a first focusing lens for focusing the processing laser beam to be applied to the workpiece; lens moving means for moving the first focusing lens in a direction perpendicular to a holding surface of the holding means; detecting means including a white light source for emitting white light, a second focusing lens for focusing the white light to the workpiece held by the holding means, a first optical fiber for guiding the white light emitted from the white light source to the second focusing lens, a detector for detecting the intensity of reflected light due to the white light focused by the second focusing lens and reflected on the workpiece, and a second optical fiber for guiding the reflected light to the detector; and control means for obtaining information on the surface of the workpiece according to the result of detection by the detector and controlling the operation of the laser processing apparatus by using the information.

Preferably, the detecting means further includes an applying diffraction grating for converting the white light emitted from the white light source into applying diffracted light and an optical system for guiding the applying diffracted light to the first optical fiber; the applying diffraction grating and the optical system being provided between the white light source and the first optical fiber. More preferably, the optical system includes a beam converting diffraction grating for converting the applying diffracted light into a collimated beam entering the first optical fiber and a rotating polygon mirror for guiding the applying diffracted light to the beam converting diffraction grating.

Preferably, the detector includes a beam splitter for separating the reflected light guided by the second optical fiber into a first light beam traveling in a first optical path and a second light beam traveling in a second optical path, a light intensity sensor for detecting the light intensity of the first light beam, a detecting diffraction grating for converting the second light beam into detecting diffracted light, and a wavelength-specific light intensity sensor for detecting the light intensity of the detecting diffracted light according to the wavelengths thereof; and the control means obtains edge position information on the workpiece according to the result of detection by the light intensity sensor and obtains height information on the workpiece according to the result of detection by the wavelength-specific light intensity sensor by referring to a control map preliminarily stored in a memory for setting the relation between the focal length of each wavelength component and the surface height of the workpiece.

Alternatively, the detector includes a detecting diffraction grating for converting the reflected light guided by the second optical fiber into detecting diffracted light and a light quantity barycenter position sensor having a given photodetecting surface for detecting the barycenter of the light quantity of the detecting diffracted light in a light receiving range thereof; and the control means obtains edge position information on the workpiece according to the result of detection by the light quantity barycenter position sensor and obtains height information on the workpiece according to the result of detection by the light quantity barycenter position sensor by referring to a control map preliminarily stored in a memory for setting the relation between the focal length of each wavelength component and the surface height of the workpiece.

Preferably, the detecting means further includes an edge detecting light source for emitting edge detecting light and applying light switching means for switching between the edge detecting light, the white light and the applying diffracted light to introduce a selected one of the edge detecting light, the white light and the applying diffracted light to the first optical fiber; the detector includes a light intensity sensor for detecting the light intensity of the edge detecting light, the white light or the applying diffracted light selected by the applying light switching means; and the control means obtains edge position information on the workpiece according to the result of detection by the light intensity sensor with the timing of selection of the edge detecting light and obtains height information on the workpiece according to the result of detection by the light intensity sensor with the timing of selection of the applying diffracted light by referring to a control map preliminarily stored in a memory for setting the relation between the focal length of each wavelength component and the surface height of the workpiece.

As described above, the laser processing apparatus according to the present invention includes the detecting means having such a configuration that the white light is guided to the second focusing lens by using the first optical fiber and next focused to the workpiece by the second focusing lens and that the reflected light from the workpiece is guided to the detector by using the second optical fiber to thereby detect the intensity of the reflected light in the detector. Accordingly, the white light to be focused to the workpiece can be easily handled and only a wavelength component focused on the workpiece can be stably propagated. As a result, the performance of measurement of the surface height of the workpiece can be improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings. In the following preferred embodiments, the present invention is applied to a laser processing apparatus such that a processing laser beam is applied to a workpiece along streets (division lines) as desired processing positions to thereby form laser processed grooves on the workpiece, whereby the workpiece is divided along the laser processed grooves.

First Preferred Embodiment

Figure 1:
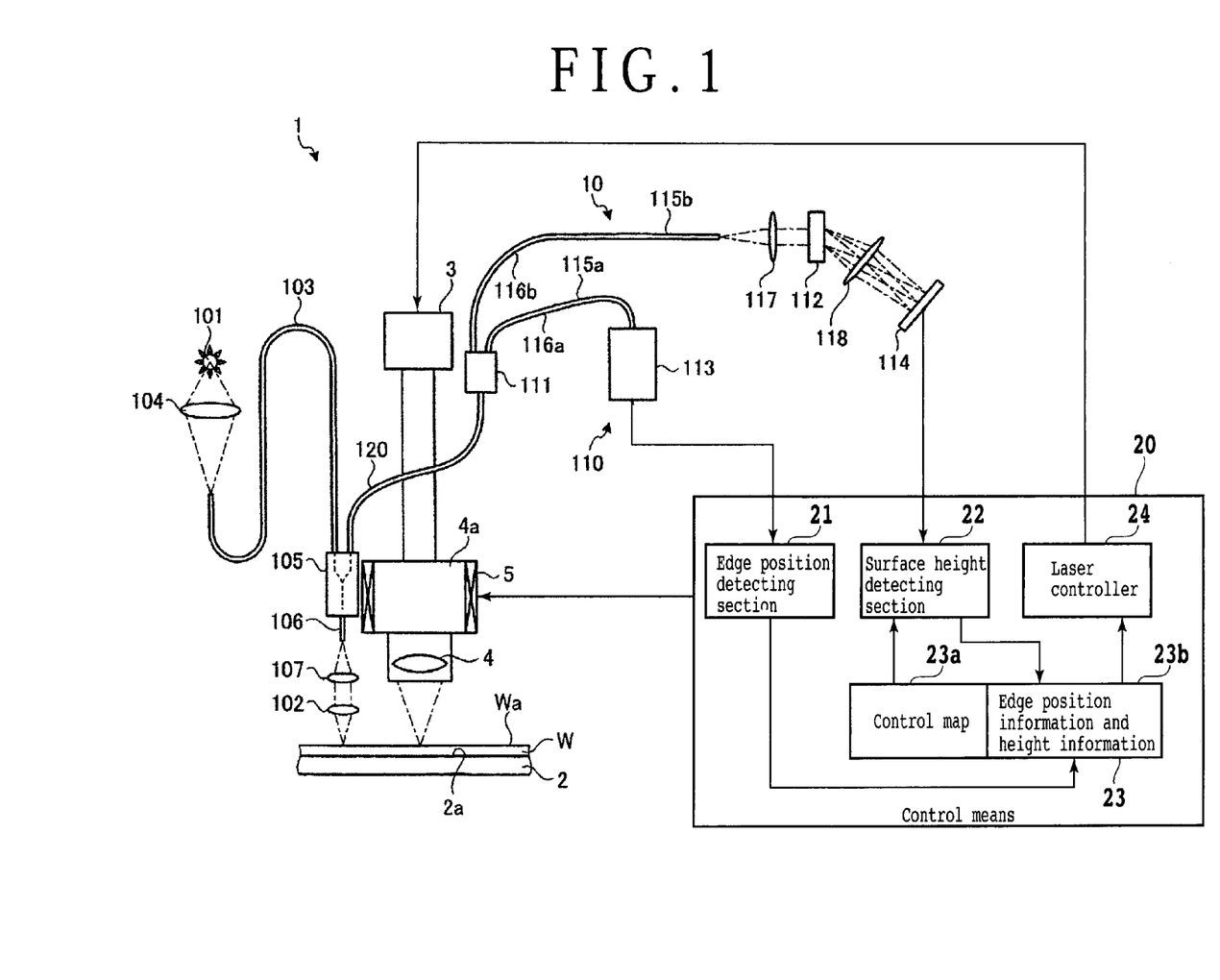
FIG. 1 is a schematic diagram showing the configuration of an essential part of a laser processing apparatus according to a first preferred embodiment of the present invention.
Figure 2:
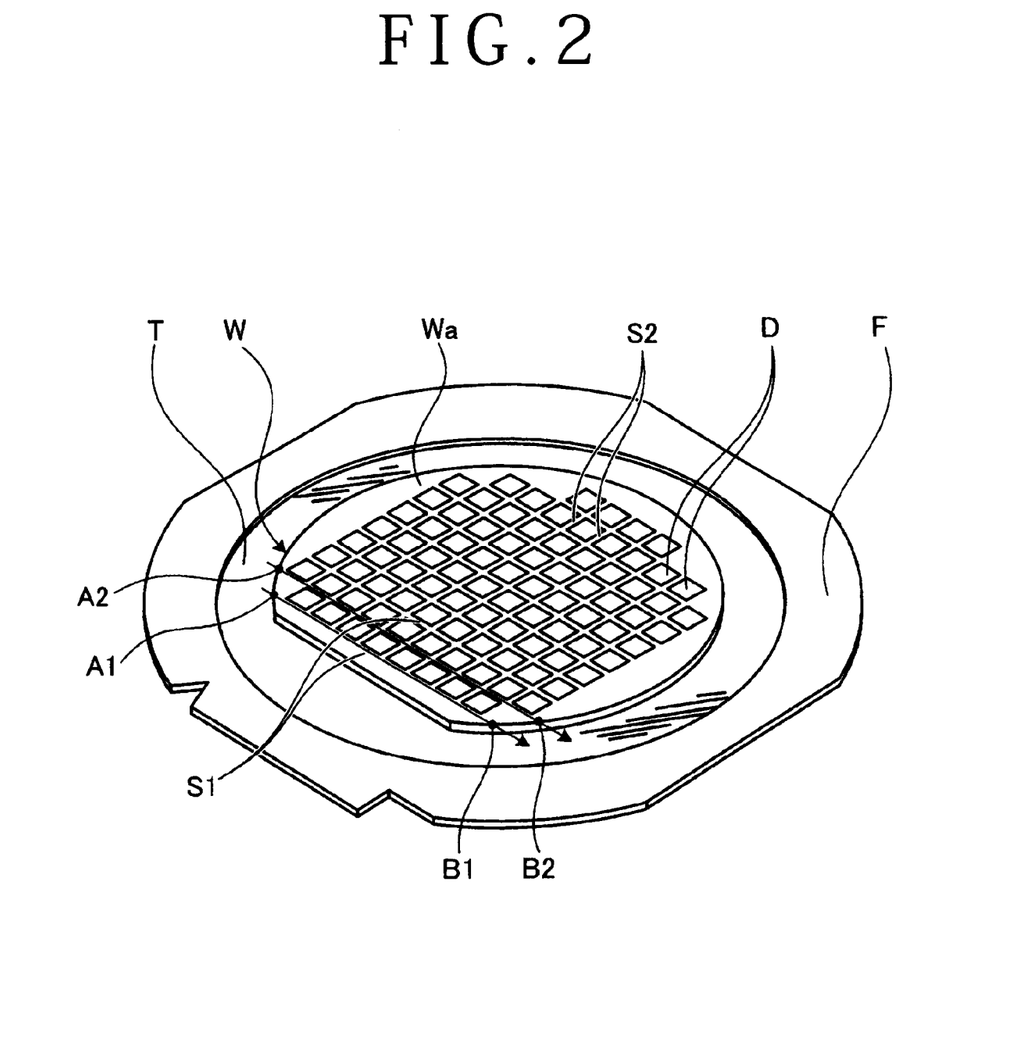
FIG. 2 is a perspective view showing a workpiece to be processed by the laser processing apparatus shown in FIG. 1.
Figure 3:
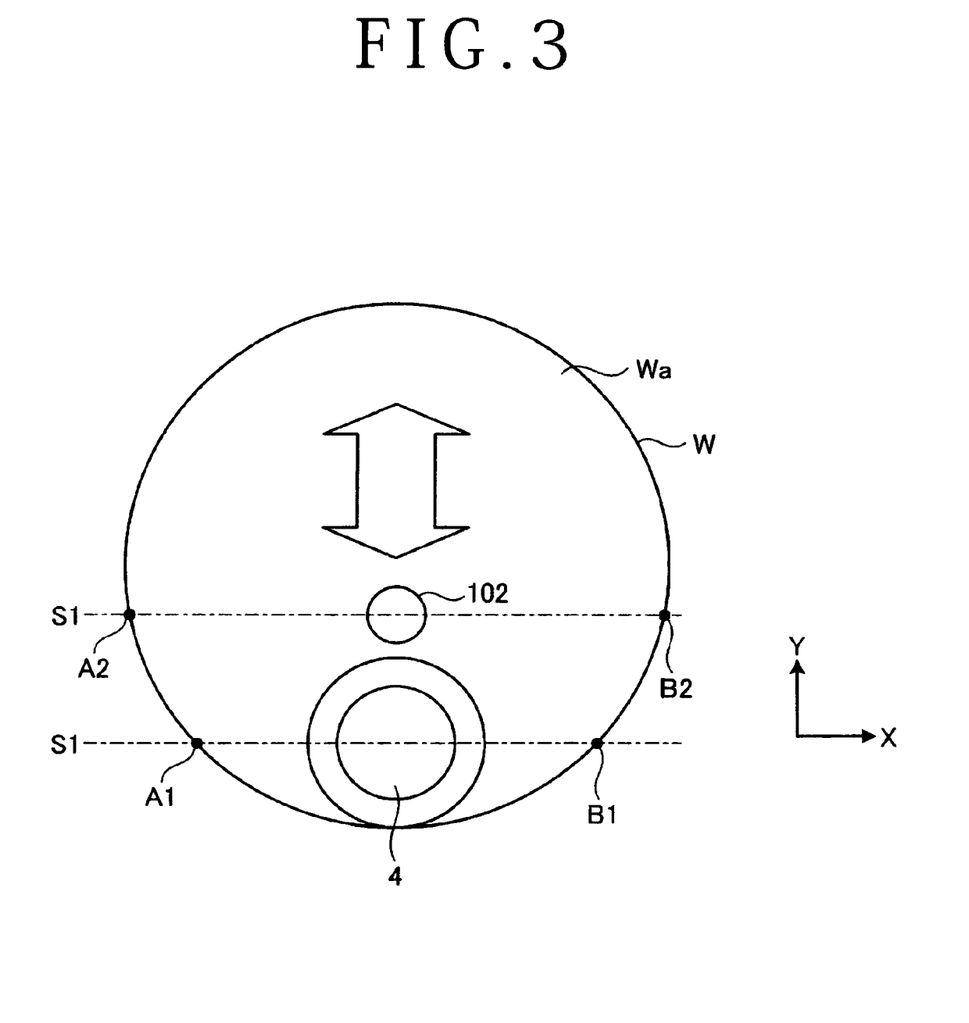
FIG. 3 is a schematic diagram showing the relation between a processing position and a detecting position on the workpiece shown in FIG. 2.

FIG. 1 is a schematic diagram showing the configuration of an essential part of a laser processing apparatus 1 according to a first preferred embodiment of the present invention. FIG. 2 is a perspective view showing a workpiece W to be processed by the laser processing apparatus 1 shown in FIG. 1. FIG. 3 is a schematic diagram showing the relation between a processing position and a detecting position on the workpiece W shown in FIG. 2. The laser processing apparatus 1 shown in FIG. 1 essentially includes holding means 2, processing laser beam applying means 3, a first focusing lens 4, and lens moving means 5.

As shown in FIG. 2, the workpiece W to be processed is attached to a dicing tape T supported to an annular frame F in the condition that the front side (upper surface) Wa of the workpiece W is oriented upward. The dicing tape T is formed from a synthetic resin sheet such as a polyolefin sheet. Examples of the workpiece W may include a wafer such as a semiconductor wafer, an adhesive member such as a DAF (Die Attach Film) provided on the back side of a wafer for chip mounting, a semiconductor product package, various substrates formed of ceramic, glass, and silicon, and various work materials required to ensure an accuracy on the order of micrometers. However, the workpiece W is not especially limited to these examples. In this preferred embodiment, the workpiece W is a semiconductor wafer, and the front side Wa of the workpiece W is formed with a plurality of first streets S1 and a plurality of second streets S2 perpendicular to the first streets S1, thereby defining a plurality of rectangular areas where a plurality of devices D are formed, respectively.

In this preferred embodiment, the holding means 2 is a chuck table having a holding surface 2a for holding the workpiece W under suction. The holding means 2 is provided with clamps (not shown) for fixing the annular frame F. The holding means 2 is connected to a motor (not shown), so that the holding means 2 is rotatable by the motor and the workpiece W held on the holding surface 2a of the holding means 2 is rotatable in a horizontal plane. Further, the holding means 2 is movable in a horizontal plane both in a feeding direction (X direction) by feeding means (not shown) and in an indexing direction (Y direction) by indexing means (not shown). Accordingly, the workpiece W held on the holding surface 2a of the holding means 2 is movable both in the feeding direction and in the indexing direction relative to the processing laser beam applying means 3 (i.e., the first focusing lens 4). Although not shown, the feeding means is provided with feeding amount detecting means for detecting the amount of feeding the workpiece W, and the indexing means is provided with indexing amount detecting means for detecting the amount of indexing the workpiece W.

The processing laser beam applying means 3 functions to apply a processing laser beam having an absorption wavelength to the workpiece W held on the holding surface 2a of the holding means 2. The processing laser beam applying means 3 includes laser beam oscillating means for oscillating a pulsed laser beam. The first focusing lens 4 functions to focus the pulsed laser beam oscillated from the laser beam oscillating means of the processing laser beam applying means 3 onto the front side Wa of the workpiece W. The lens moving means 5 functions to move a lens block 4a containing the first focusing lens 4 in a direction (Z direction) perpendicular to the holding surface 2a of the holding means 2. As described later, the lens moving means 5 is controlled by control means according to height information detected on the workpiece W. The lens moving means 5 is provided by a lens actuator for vertically moving the first focusing lens 4 under the control by the control means so that the focal position of the processing laser beam focused by the first focusing lens 4 is always located on the front side Wa of the workpiece W.

The laser processing apparatus 1 shown in FIG. 1 further includes detecting means 10 and control means 20. The detecting means 10 functions to detect a surface position along each of the streets S1 and S2 formed on the workpiece W held on the holding surface 2a of the holding means 2 and to also detect an edge position as a laser beam application start position and a laser beam application end position on the workpiece W along each of the streets S1 and S2 where the application of the laser beam by the processing laser beam applying means 3 is started and ended. The surface position is detected for the purposes of always focusing the processing laser beam on the front side Wa of the workpiece W irrespective of variations in height of the front side Wa, thereby forming a uniform laser processed groove along each street. The edge position is detected for the purposes of preventing the possibility that if the processing laser beam is applied beyond the outer circumferential edge of the workpiece W, the dicing tape T is heated to melt and adhere to the holding surface 2a of the holding means 2. Accordingly, the start timing and end timing of application of the processing laser beam are controlled at this edge position.

The detecting means 10 includes a white light source 101, a second focusing lens 102, a first optical fiber 103, a detector 110, and a second optical fiber 120. The white light source 101 is a light source for generating white light having a plurality of wavelengths. Examples of the white light source 101 may include a tungsten lamp, halogen lamp, and white LED. In this preferred embodiment, a halogen lamp is used as the white light source 101. The second focusing lens 102 functions to focus the white light generated from the white light source 101 toward the holding surface 2a of the holding means 2 (i.e., toward the workpiece W). The second focusing lens 102 is provided by a chromatic aberration lens capable of forming a plurality of focal points on the optical axis toward the workpiece W according to the plural wavelengths of the white light. That is, the second focusing lens 102 as a chromatic aberration lens has a refractive index different according to the wavelengths of the incident white light, so that the focal length of the second focusing lens 102 varies according to the wavelengths of the incident white light. In this preferred embodiment, an aspherical lens having a numerical aperture NA of 0.68 and a visual field WD of 1.56 mm is used as the second focusing lens 102. As shown in FIG. 3, the second focusing lens 102 is located in the vicinity of the first focusing lens 4 so as to be shifted therefrom by a predetermined amount in the indexing direction (Y direction). That is, the second focusing lens 102 is located over the street S1 or S2 next to the street S1 or S2 over which the first focusing lens 4 is located.

The first optical fiber 103 functions to stably propagate the white light having a fixed mode emitted from the white light source 101 to the second focusing lens 102 and to eliminate the incidence of light having any unwanted modes. A condenser lens 2104 having no chromatic aberration is provided before the entrance end of the first optical fiber 103, so as to condense the white light emitted from the white light source 101 and to efficiently make the condensed white light enter the entrance end of the first optical fiber 103. Further, a fiber coupler 105 is provided at the exit end of the first optical fiber 103, so as to couple the exit end of the first optical fiber 103 to the entrance end of the second optical fiber 120. The fiber coupler 105 is connected also to a common optical fiber 106. A collimator lens 107 having no chromatic aberration is provided between the common optical fiber 106 and the second focusing lens 102, so as to collimate the white light propagated in the first optical fiber 103 and emerged from the common optical fiber 106 and to make the collimated white light enter the second focusing lens 102.

The detector 110 functions to detect the intensity of reflected light due to the white light focused by the second focusing lens 102 and reflected on the workpiece W. The second optical fiber 120 functions to guide the reflected light due to the white light reflected on the workpiece W to the detector 10. Each of the optical fibers 103, 106, and 120 is provided by a multimode fiber composed of a core and a cladding, wherein the core diameter is 50 μm, for example.

The detector 110 in this preferred embodiment includes a beam splitter or coupler 111, a detecting diffraction grating 112, a light intensity sensor 113, and a wavelength-specific light intensity sensor 114. The beam splitter 111 functions to divide the reflected light guided by the common optical fiber 106 and the second optical fiber 120 into two beams to be guided along a first optical path 115a and a second optical path 115b. The first and second optical paths 115a and 115b are provided with separate optical fibers 116a and 116b extending from the beam splitter 111, respectively. The light intensity sensor 113 is provided by a photodetector for detecting the intensity of the reflected light divided by the beam splitter 111 and guided to the first optical path 115a by the optical fiber 116a. The light intensity sensor 113 is used for the detection of the edge position.

On the other hand, the detecting diffraction grating 112 functions to convert the reflected light divided by the beam splitter 111, guided to the second optical path 115b by the optical fiber 116b, and collimated by a collimator lens 117 into detecting diffracted light according to the wavelengths of the incident reflected light. The wavelength-specific light intensity sensor 114 functions to detect the intensity of the detecting diffracted light emerging from the detecting diffraction grating 112, wherein the detecting diffracted light enters the sensor 114 through a condenser lens 118 at different positions according to the wavelengths of the diffracted light. Examples of the wavelength-specific light intensity sensor 114 may include a CCD line sensor and a CMOS sensor, which can detect the wavelengths of the detecting diffracted light condensed by the condenser lens 118. In this preferred embodiment, a fiber type spectroscope having a sampling rate of 1 kHz is used as the wavelength-specific light intensity sensor 114, for example.

The control means 20 is provided by a computer having a ROM (not shown), a CPU (not shown) for performing computations according to a control program stored in the ROM, and a RAM 23 having a memory area 23a and a memory area 23b. The control means 20 includes an edge position detecting section 21 and a surface height detecting section 22. The edge position detecting section 21 functions to determine the edge position of the workpiece W according to the information on the light intensity detected by the light intensity sensor 113, thereby obtaining edge position information. The surface height detecting section 22 functions to determine the surface height of the workpiece W according to the result of detection by the wavelength-specific light intensity sensor 114 with reference to a control map stored in the memory area 23a of the RAM 23. The control map preliminarily sets the relation between the focal lengths of the second focusing lens 102 for the wavelengths of the white light and the surface height of the workpiece W, thereby obtaining surface height information. The edge position information obtained by the edge position detecting section 21 and the surface height information obtained by the surface height detecting section 22 are temporarily stored in the memory area 23b of the RAM 23. The control means 20 generally controls the laser processing apparatus 1. In particular, the control means 20 includes a laser controller 24 for controlling the lens moving means 5 with reference to the surface height information stored in the memory area 23b and also controlling the processing laser beam applying means 3 with reference to the edge position information stored in the memory area 23b.

Figure 4:
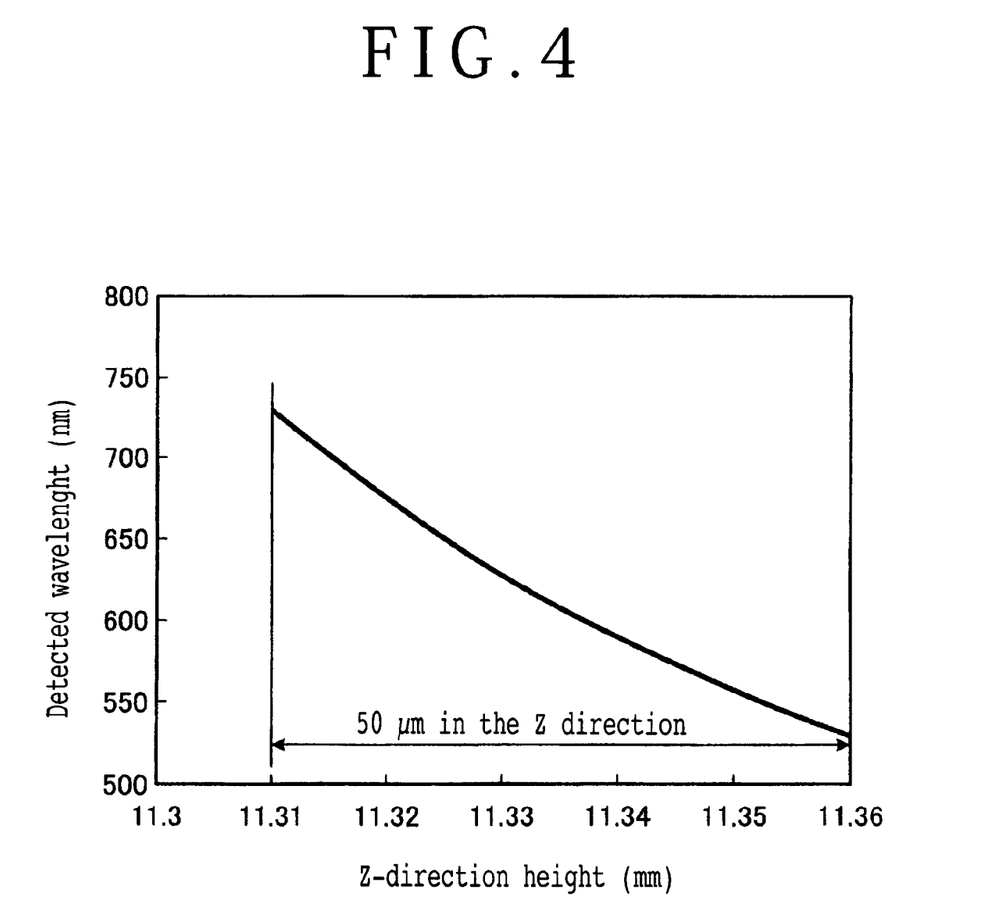
FIG. 4 is a characteristic graph showing a control map.

As shown in FIG. 4, the control map stored in the memory area 23a is obtained by preliminarily measuring the relation between Z-directional height (height of the front side Wa of the workpiece W) and peak wavelength detected by the wavelength-specific light intensity sensor 114. In the example of the control map shown in FIG. 4, the detectable wavelength range by the wavelength-specific light intensity sensor 114 is about 730 to 520 nm, and the measurable height range is 50 μm (=11.36 mm-11.31 mm). However, the measurable height range can be increased to greater than 50 μm by changing the detecting diffraction grating 112 to thereby increase the detectable wavelength range.

There will now be described the principle of detection of the height of the front side Wa of the workpiece W in this preferred embodiment. The white light emitted from the white light source 101 and introduced into the first optical fiber 103 by the condenser lens 104 is guided by the optical fibers 103 and 106 and output from the exit end of the optical fiber 106. Thereafter, the white light is collimated by the collimator lens 107 and converged toward the front side Wa of the workpiece W by the second focusing lens 102 as a chromatic aberration lens. The white light reflected on the front side Wa travels backward along the same optical path as the optical path of the incident light, and a specific wavelength component of the white light is focused on the front side Wa of the workpiece W. Accordingly, this specific wavelength component focused on the front side Wa is recoupled most intensively to the small-diameter core of the common optical fiber 106, and the remaining wavelength components of the white light reflected on the front side Wa is hardly recoupled to the core of the common optical fiber 106 thereby being cut off.

Accordingly, the specific wavelength component focused on the front side Wa of the workpiece W and recoupled to the core of the common optical fiber 106 is efficiently guided to the beam splitter 111 by the second optical fiber 120. Thereafter, the specific wavelength component is divided into two beams by the beam splitter 111, and one of the two beams is propagated along the second optical path 115b to enter the detecting diffraction grating 112. The incident light beam is converted into detecting diffracted light by the detecting diffraction grating 112, and the detecting diffracted light is refracted at an angle corresponding to the specific wavelength by the condenser lens 118 to enter the wavelength-specific light intensity sensor 114. Thereafter, the specific wavelength of the incident light is measured by the wavelength-specific light intensity sensor 114 and the peak of the specific wavelength measured above is calculated to thereby detect the specific wavelength of the light component focused on the front side Wa of the workpiece W. As a result, only the specific wavelength component focused on the front side Wa of the workpiece W can be stably propagated by using the second optical fiber 120 smaller in diameter than a pinhole, thereby improving the performance of measurement of the surface height of the workpiece W.

The surface height detecting section 22 in the control means 20 obtains the information on the peak wavelength as the result of detection by the wavelength-specific light intensity sensor 114 and refers to the control map stored in the memory area 23a to thereby determine the height of the front side Wa of the workpiece W at present to obtain surface height information. The wavelength-specific light intensity sensor 114 using a spectroscope can sequentially obtain the information on the peak wavelength at a high sampling rate of 1 kHz or more. Accordingly, in the case that the workpiece W is moved at a speed of 600 mm/s, the height of the front side Wa of the workpiece W can be measured at intervals of 0.6 mm on each of the streets S1 and S2.

There will now be described the principle of detection of the edge Ed of the workpiece W in this preferred embodiment. Basically, the detection of the edge Ed is performed by applying the light converged by the second focusing lens 102 toward the holding surface 2a so that this converged light is not focused on the holding surface 2a, but focused on the front side Wa of the workpiece W, and next detecting a change in intensity of the reflected light from the holding surface 2a and the front side Wa by using the light intensity sensor 113. That is, the light intensity of the reflected light from the holding surface 2a due to the unfocused incident light is small, whereas the light intensity of the reflected light from the front side Wa due to the focused incident light is large. Then, a change in light intensity of the reflected light is large at the position of the edge Ed of the workpiece W. Accordingly, the edge position detecting section 21 can detect the edge Ed by using a predetermined threshold value for the light intensity detected by the light intensity sensor 113.

In the case of using light having a single wavelength for the detection of the edge Ed, the detection accuracy for the edge Ed is reduced. That is, if the focal position of the light is deviated even in a small amount from the height of the front side Wa of the workpiece W, a rise in the light intensity near the edge Ed changes according to the height of the front side Wa. Further, if the deviation of the focal position from the height of the front side Wa of the workpiece W is excessive, the detection itself cannot be made.

To the contrary, the white light is converged toward the holding surface 2a by the second focusing lens 102 using a chromatic aberration lens in this preferred embodiment. Accordingly, as compared with the case of using the light having a single wavelength, the edge Ed can be reliably detected. That is, even if there are variations in height of the front side Wa of the workpiece W, the range of dispersion of the focal points can be adjusted. Further, when the position of application of the white light changes from the holding surface 2a to the front side Wa of the workpiece W, the peak power corresponding to the focal point is restored at a certain position, so that the position of the edge Ed can be detected with high accuracy.

Figure 5:
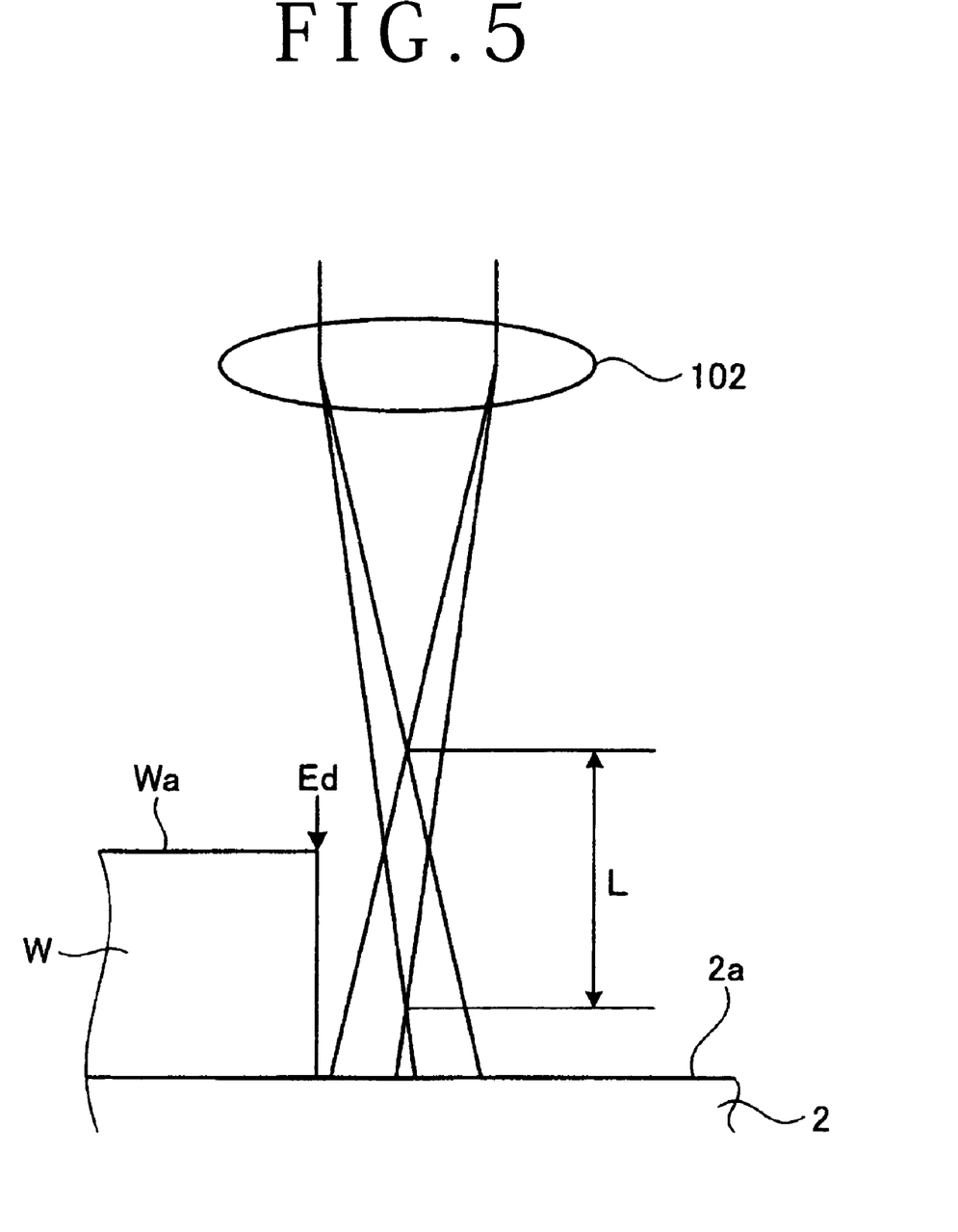
FIG. 5 is an enlarged schematic diagram showing the condition that white light is focused by a second focusing lens and applied toward a holding surface for holding the workpiece.

This point will now be described in more detail with reference to FIG. 5. FIG. 5 is an enlarged schematic diagram showing the condition that the white light is converged toward the holding surface 2a by the second focusing lens 102. As described above, the white light emitted from the white light source 101 is converged by the second focusing lens 102 using a chromatic aberration lens toward the holding surface 2a of the holding means 2 holding the workpiece W. Since the second focusing lens 102 is a chromatic aberration lens, the white light passed through the chromatic aberration lens provides different focal lengths according to the wavelengths of the white light. That is, the second focusing lens 102 has a plurality of focal points sequentially located on the optical axis toward the workpiece W according to the wavelengths of the white light.

As shown in FIG. 5, numerous focal points corresponding to the wavelengths of the white light are present in a given range L just under the optical center of the second focusing lens 102. Accordingly, the white light is applied so that the front side Wa of the workpiece W falls within the range L where the numerous focal points of the second focusing lens 102 are present. That is, even when there are variations in height of the front side Wa of the workpiece W, any wavelength component of the white light focused on the front side Wa and reflected thereon is always present, so that the position of the edge Ed can be reliably detected. The range L indicative of the dispersion of focal points can be freely designed from several micrometers to several millimeters by modifying the numerical aperture NA or material of the second focusing lens 102 or by using a diffraction lens as the second focusing lens 102.

Figure 6:
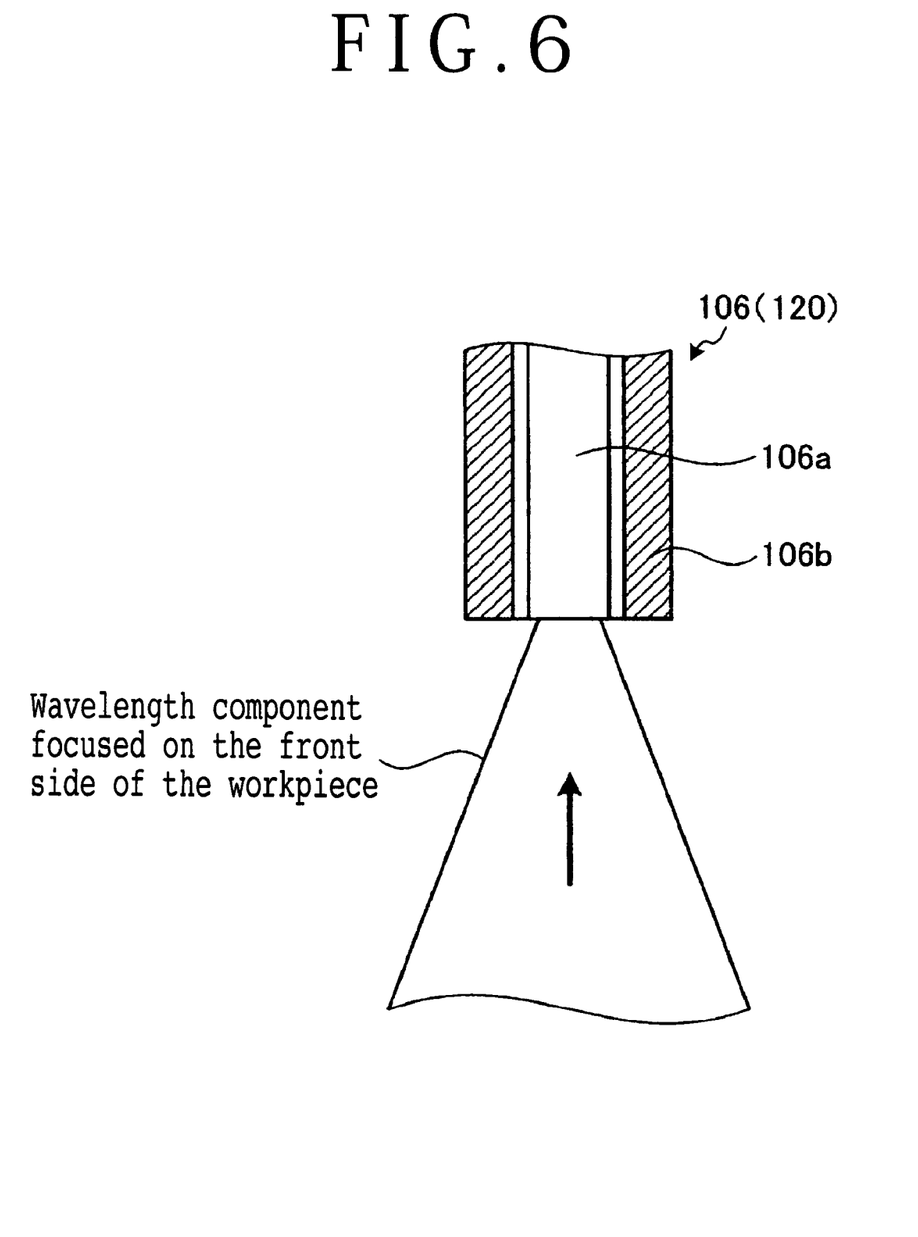
FIG. 6 is an enlarged schematic diagram showing the condition that a wavelength component focused on the front side of the workpiece and its reflected light enters an optical fiber.

The light reflected on the holding surface 2a and the front side Wa travels backward in the same optical path as the optical path of the incident light to enter the common optical fiber 106. At this time, the light unfocused and reflected on the holding surface 2a is hardly recoupled to the common optical fiber 106, so that the light quantity of this light entering the common optical fiber 106 is small and the light intensity detected by the light intensity sensor 113 is therefore small. To the contrary, the specific wavelength component of the white light focused on the front side Wa of the workpiece W irrespective of variations in height of the front side Wa is recoupled most intensively to the core 106a surrounded by the cladding 106b of the common optical fiber 106 as shown in FIG. 6. Accordingly, it is possible to increase the light intensity of this specific wavelength component guided by the common optical fiber 106 to the first optical path 115a and detected by the light intensity sensor 113.

Such edge detection may be made by using a confocal detecting apparatus and a pinhole mask as a spatial filter for introducing the specific wavelength component of the white light focused on the workpiece W to a spectroscope. However, in this case, the accuracy as a spatial filter is low and the installation of various optical components and the spectroscope is troublesome to cause a limitation to layout flexibility. Also in this respect, according to this preferred embodiment, the white light reflected on the front side Wa of the workpiece W is guided to the light intensity sensor 113 by the second optical fiber 120 having a core diameter of 50 µm, for example. Accordingly, the accuracy as a spatial filter is high and the layout flexibility is also high. Further, the light intensity sensor 113 using a photodetector rather than a spectroscope is used to detect the light intensity, so that a simple detecting system can be provided.

Further, the light intensity sensor 113 is provided on the first optical path 115a side independently of the wavelength-specific light intensity sensor 114 requiring sampling scanning, thereby always performing the detection of the edge position. Accordingly, the position of the edge Ed can be always detected with high accuracy without the influence of the sampling period of the wavelength-specific light intensity sensor 114. Further, both the surface height and the edge position of the workpiece W can be detected by the single detecting means 10 commonly using the second focusing lens 102, thereby allowing efficient detection in a limited space.

The operation of the laser processing apparatus 1 including the detecting means 10 according to this preferred embodiment will now be described. First, the workpiece W is held under suction on the holding surface 2a of the holding means 2. Thereafter, the holding means 2 thus holding the workpiece W is moved to a position directly below imaging means (not shown) to perform an alignment operation for detecting a processing area of the workpiece W to be laser-processed. More specifically, the alignment operation is performed by performing image processing such as pattern matching for making the alignment of the first streets S1 extending in a predetermined direction on the workpiece W and the first focusing lens 4 to be relatively moved along the first streets S1. Such an alignment operation is also performed along the second streets S2 in a similar manner.

Figure 7A:
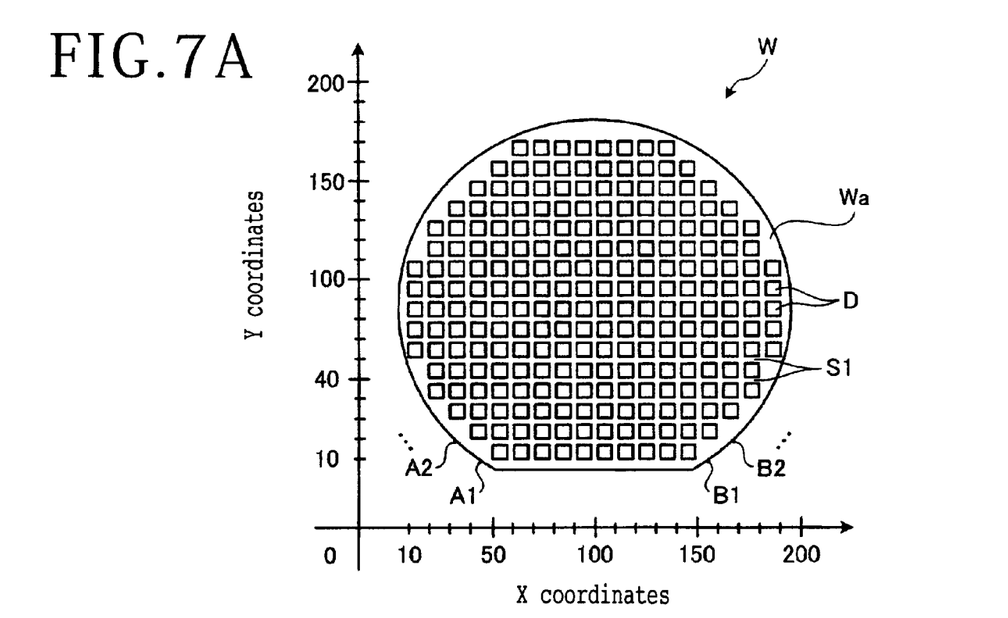
FIG. 7A is a plan view showing the X, Y coordinates of the set position of the workpiece held on the holding surface.
Figure 7B:
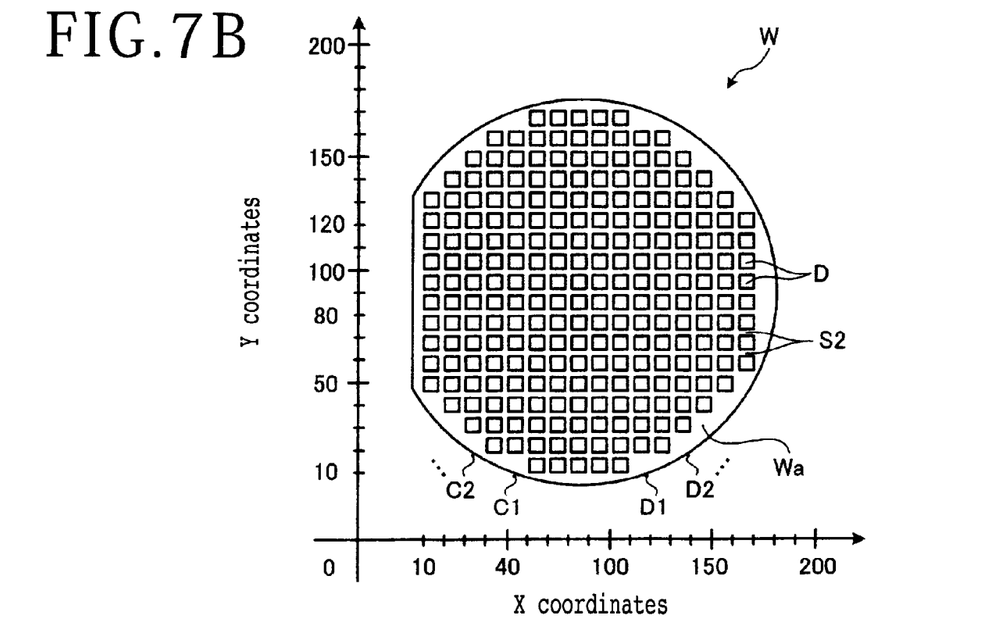
FIG. 7B is a plan view showing the condition obtained by 90° rotating the holding surface holding the workpiece shown in FIG. 7A.

By performing the alignment mentioned above, the workpiece W held on the holding means 2 is positioned as shown by X, Y coordinates in FIG. 7A. FIG. 7A is a plan view showing the X, Y coordinates of the set position of the workpiece W held on the holding means 2. FIG. 7B is a plan view showing the condition obtained by 90° rotating the holding means 2 holding the workpiece W shown in FIG. 7A. In the condition shown in FIG. 7A, the first streets S1 are processed, whereas in the condition shown in FIG. 7B, the second streets S1 are processed.

After performing the alignment to detect the first streets S1 formed on the workpiece W held on the holding means 2, the control means 20 performs the detection processing for the edge position and the surface height of the workpiece W along the first streets S1 to be processed. More specifically, the holding means 2 is moved in the Y direction to locate the lowermost first street S1 as viewed in FIG. 7A directly below the second focusing lens 102. Thereafter, the detecting means 10 is operated and the holding means 2 is moved in the feeding direction (X direction) at a predetermined feed speed. By performing this processing for the lowermost first street S1, an edge position A1 as a beam application start position, heights of the front side Wa at all positions along the lowermost first street S1, and an edge position B1 as a beam application end position are sequentially detected. The information on the edge positions A1 and B1 and the surface heights detected above is once stored in the memory area 23b so as to make these data correspond to the X, Y coordinates at the respective detection times.

The heights of the front side Wa are sequentially detected according to the sampling rate of the wavelength-specific light intensity sensor 114. For example, in the case that the sampling rate is set to 1 kHz and the workpiece W is moved at a feed speed of 600 mm/s, the heights of the front side Wa of the workpiece W are sequentially detected at intervals of 0.6 mm along the street S1.

After performing the detection processing for the lowermost first street S1, the control means 20 operates to move the holding means 2 in the Y direction so that the lowermost first street S1 shown in FIG. 7A is located directly below the first focusing lens 4. At this time, the second focusing lens 102 is located directly above the next first street S1 (i.e., the first street S1 next higher than the lowermost first street S1 as viewed in FIG. 7A). The control means 20 performs laser processing for the lowermost first street S1 and detection processing for the edge position and surface height of the workpiece W for the next first street S1 at the same time. In performing the laser processing, the holding means 2 is moved in the feeding direction (X direction) at a predetermined feed speed. At this time, the control means 20 controls the laser processing operation with reference to the information on the edge positions A1 and B1 and the heights of the front side Wa of the workpiece W along the lowermost first street S1, wherein this information is previously stored in the memory area 23b.

That is, the processing laser beam applying means 3 is driven through the laser controller 24 so that the processing laser beam starts to be applied at the time the first focusing lens 4 has reached the edge position A1, thus starting the application of the processing laser beam to the workpiece W. Thereafter, the holding means 2 holding the workpiece W is moved in the X direction to thereby form a laser processed groove along the lowermost first street S1 on the front side Wa of the workpiece W as controlling the lens moving means 5 according to the information on the surface height of the workpiece W. That is, the lens moving means 5 is controlled by the control means 20 so that the focal position of the processing laser beam focused by the first focusing lens 4 is always located on the front side Wa of the workpiece W. As a result, the processing laser beam applied by the processing laser beam applying means 3 can be always focused on the front side Wa of the workpiece W by the first focusing lens 4 controlled by the control means 20, so that the laser processed groove can be reliably formed along the lowermost first street S1 on the front side Wa of the workpiece W irrespective of unevenness of the front side Wa of the workpiece W.

Thereafter, the operation of the processing laser beam applying means 3 is stopped through the laser controller 24 so that the application of the processing laser beam is stopped at the time the first focusing lens 4 has reached the edge position B1, thus stopping the application of the processing laser beam to the workpiece W. Simultaneously with this laser processing operation, the detecting means 10 is operated to sequentially detect the edge position and the surface height on the next first street S1. That is, an edge position A2 as a beam application start position, heights of the front side Wa at all positions along the next first street S1, and an edge position B2 as a beam application end position are sequentially detected. The information on the edge positions A2 and B2 and the surface heights detected above is once stored in the memory area 23b so as to make these data correspond to the X, Y coordinates at the respective detection times.

Such laser processing by the processing laser beam applying means 3 and the detection by the detecting means 10 are concurrently repeated for the remaining first streets S1. After performing the laser processing and the detection of the edge position and the surface height for all the first streets S1, the holding means 2 is rotated 90° to bring the workpiece W into the condition shown in FIG. 7B and to similarly perform the laser processing and the detection of the edge position and the surface height for all the second streets S2. As shown in FIG. 7B, edge positions C1, D1, C2, D2, . . . are sequentially detected. After performing the laser processing and the detection along all the second streets S2, the holding means 2 holding the workpiece W is returned to its initial position and the vacuum chuck to the workpiece W is canceled. Thereafter, the workpiece W is subjected to a dividing step by transporting means (not shown).

Second Preferred Embodiment

Figure 8:
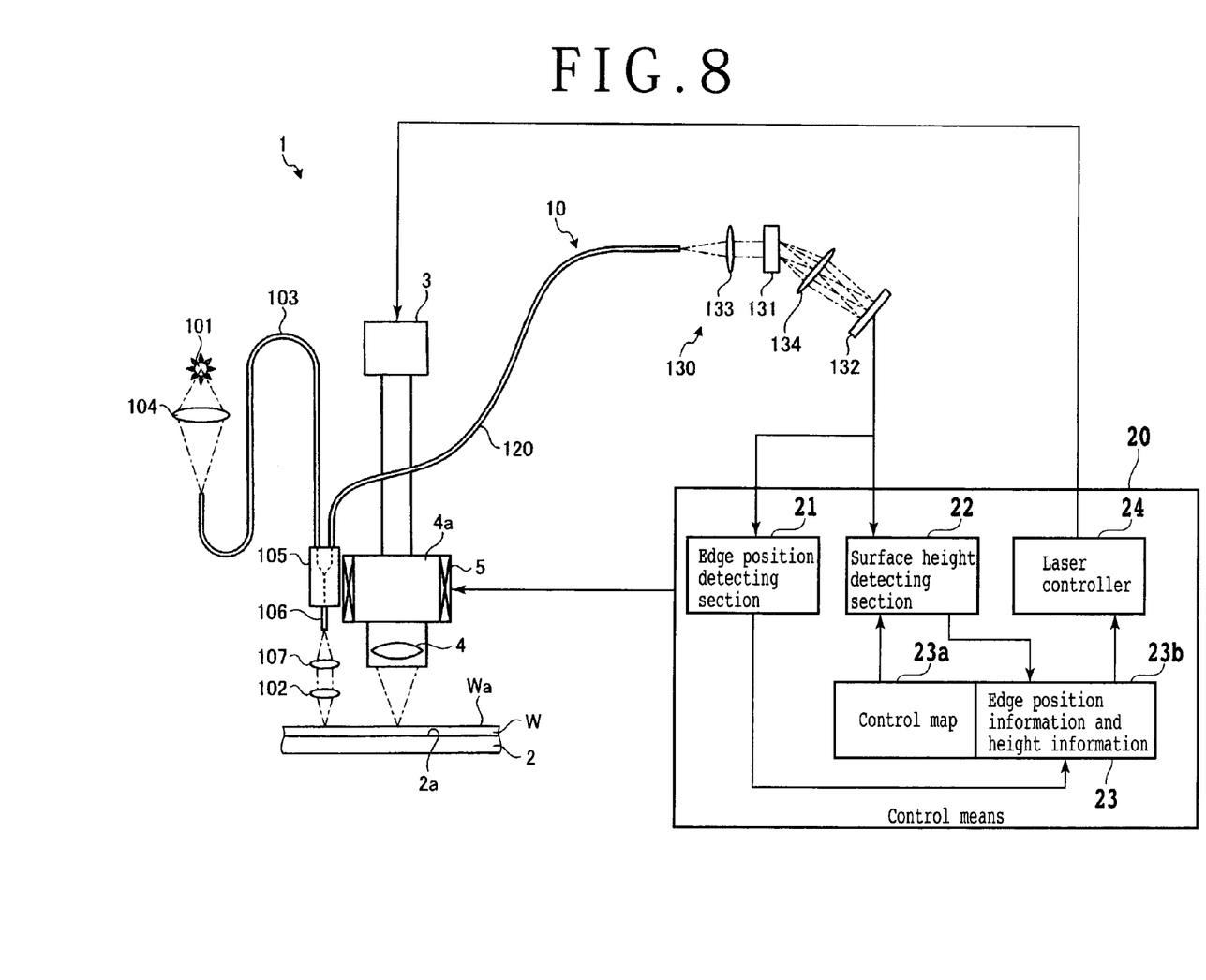
FIG. 8 is a schematic diagram showing the configuration of an essential part of a laser processing apparatus according to a second preferred embodiment of the present invention.

FIG. 8 is a schematic diagram showing the configuration of an essential part of a laser processing apparatus 1 according to a second preferred embodiment of the present invention. In FIG. 8, the same parts as those shown in FIG. 1 are denoted by the same reference numerals and the description thereof will be omitted herein (ditto for a third preferred embodiment to be described later). The laser processing apparatus 1 according to the second preferred embodiment includes a detector 130 in place of the detector 110 in the detecting means 10 of the first preferred embodiment. The detector 130 includes a detecting diffraction grating 131 and a light quantity barycenter position sensor 132. The detecting diffraction grating 131 functions to convert the reflected light guided by the second optical fiber 120 and collimated by a collimator lens 133 into detecting diffracted light according to the wavelengths of the incident reflected light.

The light quantity barycenter position sensor 132 functions to receive the detecting diffracted light from the detecting diffraction grating 131 through a condenser lens 134 inclined a predetermined angle with respect to the optical axis, wherein the detecting diffracted light is refracted at different angles according to the wavelengths of the diffracted light by the condenser lens 134, thereby detecting the barycenter of the light quantity of the incident diffracted light in a light receiving range thereof. For example, a PSD (semiconductor position sensor) having a given photodetecting surface is used as the light quantity barycenter position sensor 132, and it is commonly used for the detection of the height of the front side Wa of the workpiece W and the detection of the position of the edge Ed of the workpiece W. More specifically, the light quantity barycenter position sensor 132 is a sensor having a given photodetecting surface uniformly coated with a material capable of generating a voltage corresponding to the light quantity received. When a light spot is applied to the sensor, a voltage corresponding to the light quantity received is generated partially according to a light receiving position. Accordingly, the applied position of the light spot is determined according to the ratio between voltages generated at the opposite ends of the sensor. Accordingly, by bringing the spot positions of the detecting diffracted light refracted at different angles by the condenser lens 134 into correspondence with the wavelengths of the diffracted light, the wavelength of the light focused on the front side Wa of the workpiece W can be detected.

The surface height detecting section 22 in the control means 20 receives the information on peak wavelength as the result of detection by the light quantity barycenter position sensor 132 and refers to the control map stored in the memory 23a, thereby determining the current height of the front side Wa of the workpiece W to obtain surface height information. The light quantity barycenter position sensor 132 does not require scanning as performed by the wavelength-specific light intensity sensor 114 shown in FIG. 1. Accordingly, the response speed can be increased and it is therefore possible to continuously detect the height of the front side Wa of the workpiece W. Further, even when the light spot is moved at a high speed, the position of the light spot can be measured with high accuracy.

On the other hand, the detection of the edge Ed is performed by applying the light converged by the second focusing lens 102 toward the holding surface 2a so that this converged light is not focused on the holding surface 2a, but focused on the front side Wa of the workpiece W, and next detecting a change in intensity of the reflected light from the holding surface 2a and the front side Wa by using the light quantity barycenter position sensor 132. That is, the light intensity of the reflected light from the holding surface 2a due to the unfocused incident light is small, whereas the light intensity of the reflected light from the front side Wa due to the focused incident light is large. Then, a change in light intensity of the reflected light is large at the position of the edge Ed of the workpiece W. Accordingly, the edge position detecting section 21 can detect the edge Ed by using a predetermined threshold value for the light intensity detected by the light quantity barycenter position sensor 132. Unlike the wavelength-specific light intensity sensor 114 shown in FIG. 1, the light quantity barycenter position sensor 132 does not require scanning. Accordingly, the response speed can be increased and it is therefore possible to continuously detect the light intensity of the reflected light. As a result, the edge position can be detected with high accuracy by the light quantity barycenter position sensor 132 commonly used for the detection of the surface height.

Third Preferred Embodiment

Figure 9:
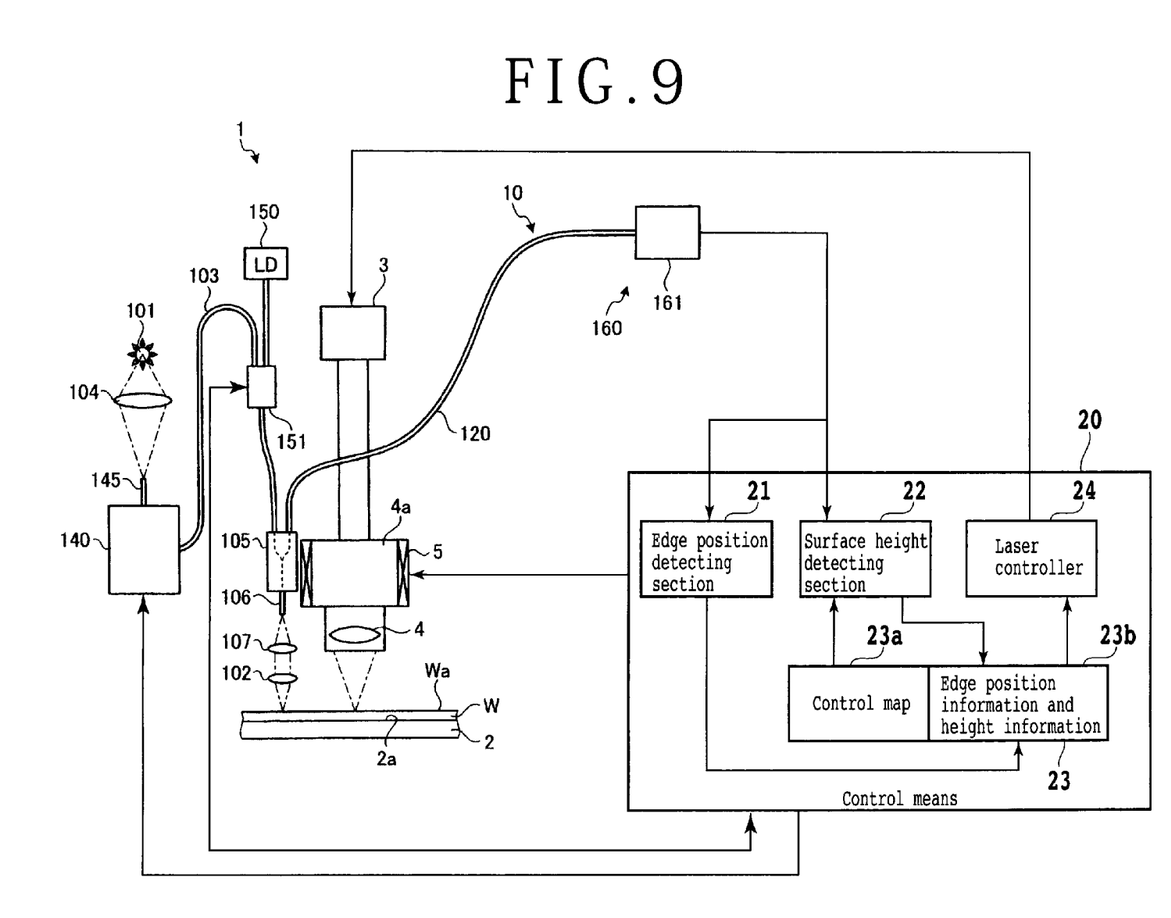
FIG. 9 is a schematic diagram showing the configuration of an essential part of a laser processing apparatus according to a third preferred embodiment of the present invention.
Figure 10:
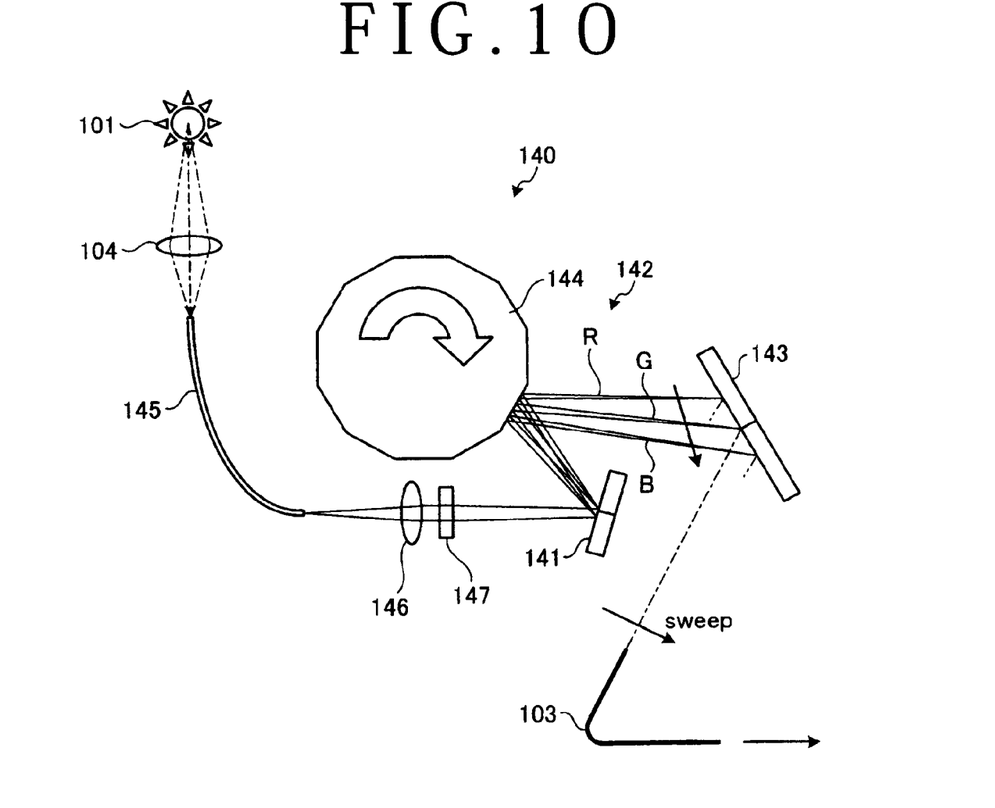
FIG. 10 is a schematic diagram showing the configuration of an optical system for applying white light in the third preferred embodiment.
Figure 11:
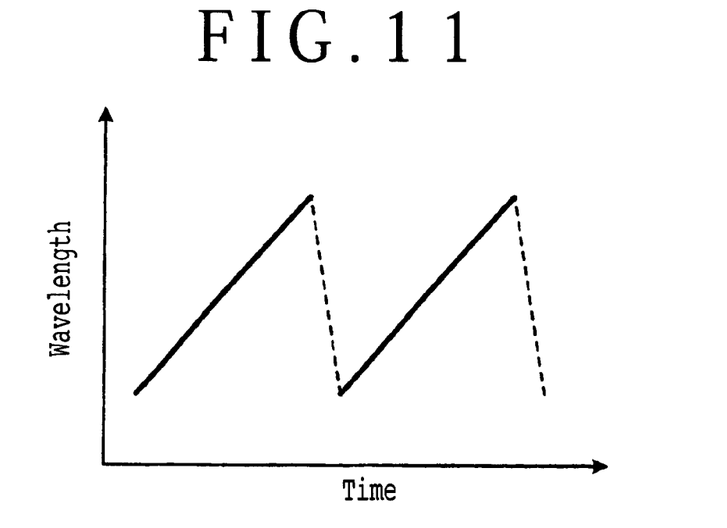
FIG. 11 is a graph showing the timing of scanning with the wavelength components of the white light by the optical system shown in FIG. 10.

FIG. 9 is a schematic diagram showing the configuration of an essential part of a laser processing apparatus 1 according to a third preferred embodiment of the present invention. FIG. 10 is a schematic diagram showing the configuration of an optical system for applying white light shown in FIG. 9. FIG. 11 is a graph showing the timing of scanning with the wavelength components of the white light by the optical system shown in FIG. 10. The detecting means 10 of the laser processing apparatus 1 shown in FIG. 9 includes wavelength selecting means 140 on the white light application side and an edge detecting light source 150 independent of the white light source 101 on the white light application side. The detecting means 10 in this preferred embodiment further includes a detector 160 in place of the detector 110 shown in FIG. 1.

As shown in FIG. 10, the wavelength selecting means 140 includes an applying diffraction grating 141 and an optical system 142 between the white light source 101 and the first optical fiber 103. The optical system 142 includes a beam converting diffraction grating 143 and a rotating polygon mirror 144. The applying diffraction grating 141 functions to convert the white light into applying diffracted light, wherein the white light emitted from the white light source 101 is converged by the condenser lens 104 and next guided by a multimode optical fiber 145 having a relatively large diameter to enter the diffraction grating 141. More specifically, the white light guided by the optical fiber 145 is collimated by a collimator lens 146 and next converged by a condenser lens 147 to enter the diffraction grating 141 as detecting diffracted light. The incident white light is reflected at different angles corresponding to the wavelengths of the white light by the diffraction grating 141.

The optical system 142 functions to continuously change the wavelength of the applying diffracted light obtained by the applying diffraction grating 141 and to sequentially introduce the applying diffracted light to the first optical fiber 103. The rotating polygon mirror 144 has a plurality of reflecting surfaces on which the detecting diffracted light from the diffraction grating 141 is sequentially incident. The rotating polygon mirror 144 is rotated at a high speed to thereby rotationally scan with the incident detecting diffracted light. FIG. 10 shows a condition that R (red light), G (green light), and B (blue light) are sequentially applied to scan. The beam converting diffraction grating 143 functions to collimate the detecting diffracted light scanned at high speed and reflected by the rotating polygon mirror 144 and to introduce a specific wavelength component of the detecting diffracted light entering at a predetermined incident angle into the first optical fiber 103.

The incident angle of the applying diffracted light entering the beam converting diffraction grating 143 sequentially changes with rotation of the rotating polygon mirror 144. Accordingly, the wavelength components of the diffracted light ranging from lower wavelengths to higher wavelengths are swept with the elapse of time in accordance with the characteristic shown in FIG. 11, in order that the wavelength components are sequentially introduced into the first optical fiber 103. At this time, the wavelength of the light entering the first optical fiber 103 can be determined according to the information on time by referring to the characteristic shown in FIG. 11, and the information on wavelength of the applying diffracted light to be applied to the workpiece W at this time is transmitted to the control means 20. That is, in this preferred embodiment, the white light itself is not used for the detection of the height of the front side Wa of the workpiece W, but it is converted into the applying diffracted light, whose wavelength components are separated with time and the wavelength is continuously changed.

On the other hand, the edge detecting light source 150 is a dedicated light source for always applying white light as edge detecting light toward the workpiece W independently of the wavelength selective application of white light (spectral scanning according to wavelength) by the wavelength selecting means 140. For example, a laser diode is used as the edge detecting light source 150. The edge detecting light emitted from the edge detecting light source 150 and the applying diffracted light obtained by the wavelength selecting means 140 are selectively applied toward the workpiece W. That is, the first optical fiber 103 is provided with detection light switching means 151 for switching between the edge detecting light and the applying diffracted light at a high speed required for the edge detection to guide the selected light to the first optical fiber 103. The information on switching by the detection light switching means 151 is transmitted to the control means 20. The detector 160 is provided by a light intensity sensor 161 for detecting the light intensity of the edge detecting light or the applying diffracted light selected by the detection light switching means 151. For example, a normal photodetector is used as the light intensity sensor 161.

The edge position detecting section 21 of the control means 20 in this preferred embodiment obtains the information on edge position of the workpiece W according to the result of detection by the light intensity sensor 161 with the timing of application of the edge detecting light selected by the detection light switching means 151. The surface height detecting section 22 of the control means 20 in this preferred embodiment refers to the control map preliminarily stored in the memory area 23a and obtains the information on surface height of the workpiece W according to the information on wavelength at the time the light intensity output from the light intensity sensor 161 shows a peak value with the timing of application of the applying diffracted light selected by the detection light switching means 151. That is, in this preferred embodiment, the white light is spectrally separated into wavelength components continuous with the elapse of time on the light application side, and these continuous wavelength components are incident on the workpiece W. Accordingly, the surface height of the workpiece W can be detected on the detection side by using the simple light intensity sensor 161.

The present invention is not limited to the above preferred embodiments, but various modifications may be made without departing from the scope of the present invention. For example, while a processing laser beam having an absorption wavelength to the workpiece W is applied to the front side Wa of the workpiece W to thereby form laser processed grooves in this preferred embodiment, a processing laser beam having a transmission wavelength to the workpiece W may be applied to the workpiece W at a given depth from the front side Wa to thereby form modified layers at the given depth irrespective of variations in surface height of the front side Wa.

Further, while the workpiece W is supported to the dicing tape T in this preferred embodiment, the workpiece W may be directly held on the holding surface 2a of the holding means 2 without using the dicing tape T. In this case, high-precision detection of the edge position according to the present invention can avoid the possibility that the processing laser beam may be applied to the holding surface 2a holding the workpiece W. Further, the wavelength selecting means 140 used in the third preferred embodiment may be applied to the light application side in the first or second preferred embodiment.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
holding means for holding a workpiece;
processing laser beam applying means for applying a processing laser beam to said workpiece held by said holding means;
a first focusing lens for focusing said processing laser beam to be applied to said workpiece;
lens moving means for moving said first focusing lens in a direction perpendicular to a holding surface of said holding means;
detecting means including a white light source for emitting white light, a second focusing lens for focusing said white light to said workpiece held by said holding means, a first optical fiber for guiding said white light emitted from said white light source to said second focusing lens, a detector for detecting the intensity of reflected light due to said white light focused by said second focusing lens and reflected on said workpiece, and a second optical fiber for guiding said reflected light to said detector; and
control means for obtaining information on the surface of said workpiece according to the result of detection by said detector and controlling the operation of said laser processing apparatus by using said information,
wherein:
said detector includes a beam splitter for splitting said reflected light guided by said second optical fiber into a first light beam traveling in a first optical path and a second light beam traveling in a second optical path, a light intensity sensor for detecting the light intensity of said first light beam, a detecting diffraction grating for converting said second light beam into detecting diffracted light, and a wavelength-specific light intensity sensor for detecting the light intensity, according to the wavelengths, of said detecting diffracted light guided to said second optical path and converted by said detecting diffraction grating; and
said control means obtains edge position information on said workpiece according to the result of detection by said light intensity sensor and obtains height information on said workpiece according to the result of detection by said wavelength-specific light intensity sensor by referring to a control map preliminarily stored in a memory for setting the relation between the focal length of each wavelength component and the surface height of said workpiece.

2. A laser processing apparatus comprising:
holding means for holding a workpiece;
processing laser beam applying means for applying a processing laser beam to said workpiece held by said holding means;
a first focusing lens for focusing said processing laser beam to be applied to said workpiece;
lens moving means for moving said first focusing lens in a direction perpendicular to a holding surface of said holding means;
detecting means including a white light source for emitting white light, a second focusing lens for focusing said white light to said workpiece held by said holding means, a first optical fiber for guiding said white light emitted from said white light source to said second focusing lens, a detector for detecting the intensity of reflected light due to said white light focused by said second focusing lens and reflected on said workpiece, and a second optical fiber for guiding said reflected light to said detector; and
control means for obtaining information on the surface of said workpiece according to the result of detection by said detector and controlling the operation of said laser processing apparatus by using said information,
wherein:
said detector includes a detecting diffraction grating for converting said reflected light guided by said second optical fiber into detecting diffracted light and a light quantity barycenter position sensor having a given photodetecting surface for detecting the barycenter of the light quantity of said detecting diffracted light in a light receiving range thereof; and
said control means obtains edge position information on said workpiece according to the result of detection by said light quantity barycenter position sensor and obtains height information on said workpiece according to the result of detection by said light quantity barycenter position sensor by referring to a control map preliminarily stored in a memory for setting the relation between the focal length of each wavelength component and the surface height of said workpiece.

3. A laser processing apparatus comprising:
holding means for holding a workpiece;

processing laser beam applying means for applying a processing laser beam to said workpiece held by said holding means;
a first focusing lens for focusing said processing laser beam to be applied to said workpiece;
lens moving means for moving said first focusing lens in a direction perpendicular to a holding surface of said holding means;
detecting means including a white light source for emitting white light, a second focusing lens for focusing said white light to said workpiece held by said holding means, a first optical fiber for guiding said white light emitted from said white light source to said second focusing lens, a detector for detecting the intensity of reflected light due to said white light focused by said second focusing lens and reflected on said workpiece, and a second optical fiber for guiding said reflected light to said detector; and
control means for obtaining information on the surface of said workpiece according to the result of detection by said detector and controlling the operation of said laser processing apparatus by using said information,
wherein said detecting means further includes an applying diffraction grating for converting said white light into applying diffracted light and an optical system for guiding said applying diffracted light to said first optical fiber;
said applying diffraction grating and said optical system being provided between said white light source and said first optical fiber;
wherein;
said detecting means further includes an edge detecting light source for emitting edge detecting light and applying light switching means for switching between said edge detecting light and said applying diffracted light to introduce a selected one of said edge detecting light and said applying diffracted light to said first optical fiber;
said detector includes a light intensity sensor for detecting the light intensity of said edge detecting light or said applying diffracted light selected by said applying light switching means; and
said control means obtains edge position information on said workpiece according to the result of detection by said light intensity sensor with the timing of selection of said edge detecting light and obtains height information on said workpiece according to the result of detection by said light intensity sensor with the timing of selection of said applying diffracted light by referring to a control map preliminarily stored in a memory for setting the relation between the focal length of each wavelength component and the surface height of said workpiece.

* * * * *